United States Patent
Murai et al.

(10) Patent No.: US 10,498,932 B2
(45) Date of Patent: Dec. 3, 2019

(54) VIDEO PROCESSING DEVICE (71) Applicant: Sharp Kabushiki Kaisha, Osaka (JP)

(72) Inventors: Takayuki Murai, Osaka (JP); Masaaki Moriya, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 247 days.

(21) Appl. No.: 15/524,378

(22) PCT Filed: Dec. 4, 2015

(86) PCT No.: PCT/JP2015/084103
§ 371 (c)(1),
(2) Date: May 4, 2017

(87) PCT Pub. No.: WO2016/093160
PCT Pub. Date: Jun. 16, 2016

(65) Prior Publication Data
US 2018/0288287 A1 Oct. 4, 2018

(30) Foreign Application Priority Data

Dec. 8, 2014 (JP) .................................. 2014-247947

(51) Int. Cl.
H04N 5/20 (2006.01)
G06T 7/254 (2017.01)
(Continued)

(52) U.S. Cl.
CPC ............... *H04N 5/20* (2013.01); *G06T 7/254* (2017.01); *H04N 5/147* (2013.01); *H04N 7/014* (2013.01); *H04N 5/21* (2013.01)

(58) Field of Classification Search
CPC ............ H04N 5/20; H04N 5/147; H04N 5/21; H04N 7/014; G06T 3/0056
(Continued)

(56) References Cited

U.S. PATENT DOCUMENTS 6,473,459 B1 * 10/2002 Sugano ................ H04N 19/142
375/240.16
7,058,130 B2 * 6/2006 Liu ........................ H04N 5/147
348/699
(Continued)

FOREIGN PATENT DOCUMENTS

JP 4506548 B2 5/2010

OTHER PUBLICATIONS

WIPO document_WO 2012/153661 A1_Zhang_Sharp_English translation (Year: 2012).*

*Primary Examiner* — Nathan J Flynn
*Assistant Examiner* — Caroline Somera
(74) *Attorney, Agent, or Firm* — ScienBiziP, P.C.

(57) ABSTRACT

A multiple-frame detecting unit performs a prescribed detection process by taking the time corresponding to a plurality of unit images of the video signal. A video change detecting unit detects a change in video between the unit images of the video signal. If no change in the video is detected by the video change detecting unit, a correction unit performs a correction process with a first correction intensity on the video signal corresponding to a detection target image area in the unit images of the detection process being performed by the multiple-frame detecting unit, and a correction process with a second correction intensity on the video signal corresponding to an image area other than the detection target image area. When the video change detecting unit detects the change in the video, the correction unit performs the correction process with the second correction intensity on the video signal.

10 Claims, 7 Drawing Sheets (51) Int. Cl.
   *H04N 5/21*   (2006.01)
   *H04N 5/14*   (2006.01)
   *H04N 7/01*   (2006.01)

(58) Field of Classification Search
   USPC .......................................................... 348/701
   See application file for complete search history.

(56) References Cited

U.S. PATENT DOCUMENTS

| | | | | |
|---|---|---|---|---|
| 8,334,932 | B2* | 12/2012 | Kiuchi | H04N 5/147 |
| | | | | 348/618 |
| 8,374,458 | B2* | 2/2013 | Inoue | H04N 1/407 |
| | | | | 382/274 |
| 8,830,339 | B2* | 9/2014 | Velarde | H04N 5/232 |
| | | | | 348/208.16 |
| 2009/0052783 | A1* | 2/2009 | Aoki | G06K 9/00228 |
| | | | | 382/209 |
| 2010/0194990 | A1* | 8/2010 | Kiuchi | H04N 5/147 |
| | | | | 348/607 |
| 2014/0168479 | A1* | 6/2014 | Ishii | H04N 5/23212 |
| | | | | 348/241 |
| 2015/0242704 | A1* | 8/2015 | Nobori | G09G 5/003 |
| | | | | 345/589 |

* cited by examiner

VIDEO PROCESSING DEVICE

TECHNICAL FIELD

The present invention relates to a video processing technique, for example, a technique for performing a correction process on a video signal by using a detection result of a detection process which requires the time corresponding to the video signal for a plurality of frames in order to obtain a process result.

BACKGROUND ART

A technique for performing a correction process on a video signal by detecting a change (for example, a scene change) between frames of the video signal and varying a correction amount in accordance with a result of the detection has been developed, and development is ongoing.

For example, PTL 1 (Japanese Patent No. 4506548) discloses a video processing device including two video information detecting units each configured to detect video information from a corresponding one of video signals upstream and downstream of a video processing unit configured to perform prescribed signal processing on the video signal by using a memory unit such as a frame memory, wherein the presence or the absence of a scene change is determined from the video information detected by the detection unit located upstream of the video processing unit, and an image quality correction amount is obtained from the video information detected by the detection unit located downstream of the video processing unit. Then, in the video processing device disclosed in PTL 1, when the occurrence of a scene change is determined, the image quality correction amount is corrected, and an image quality correction is performed on the video signal with the image quality correction amount which has been corrected. This can reduce degradation in image quality due to a correction deviation caused by the scene change.

SUMMARY OF INVENTION

Technical Problem

However, the technique disclosed in PTL 1 requires that the process performed by the detection unit located downstream of the video processing unit is completed within one frame, and therefore, it is difficult to apply the technique disclosed in PTL 1 to a case of performing a detection process which requires the time corresponding to a plurality of frames in order to obtain a process result.

Therefore, in view of the foregoing, it is an object of the present invention to realize a video processing device which enables a correction process to be appropriately performed on a video signal even in the case of performing a detection process which requires the time corresponding to the video signal for a plurality of frames in order to obtain a process result.

Solution to Problem

To solve the problem, a first configuration is a video signal processing device for processing a video signal capable of forming a plurality of unit images, the video signal processing device including: a multiple-frame detecting unit; a video change detecting unit; and a correction unit.

The multiple-frame detecting unit performs a prescribed detection process which requires the time corresponding to the plurality of unit images of the video signal in order to obtain a process result, and the multiple-frame detecting unit acquires a detection target image area on the basis of a detection result.

The video change detecting unit detects a change in video between the unit images of the video signal.

The correction unit performs a correction process on the video signal on the basis of the detection result acquired by the multiple-frame detecting unit and a detection result acquired by the video change detecting unit.

(A) If no change in the video is detected by the video change detecting unit, the connection unit performs (A1) the correction process with a first correction intensity on the video signal corresponding to the detection target image area in the unit images of the detection process being performed by the multiple-frame detecting unit, and (A2) the correction process with a correction intensity different from the first correction intensity on the video signal corresponding to an image area other than the detection target image area.

(B) If a change in the video is detected by the video change detecting unit, the correction unit performs the correction process with a correction intensity different from the first correction intensity on the video signal.

Advantageous Effects of Invention

According to the present invention, it is possible to realize a video processing device which enables a correction process to be appropriately performed on a video signal even in the case of performing a detection process which requires the time corresponding to the video signal for a plurality of frames in order to obtain a process result.

DESCRIPTION OF EMBODIMENTS

First Embodiment

A first embodiment will be described below with reference to the drawings.

1.1: Configuration of Video Processing Device

Figure 1:
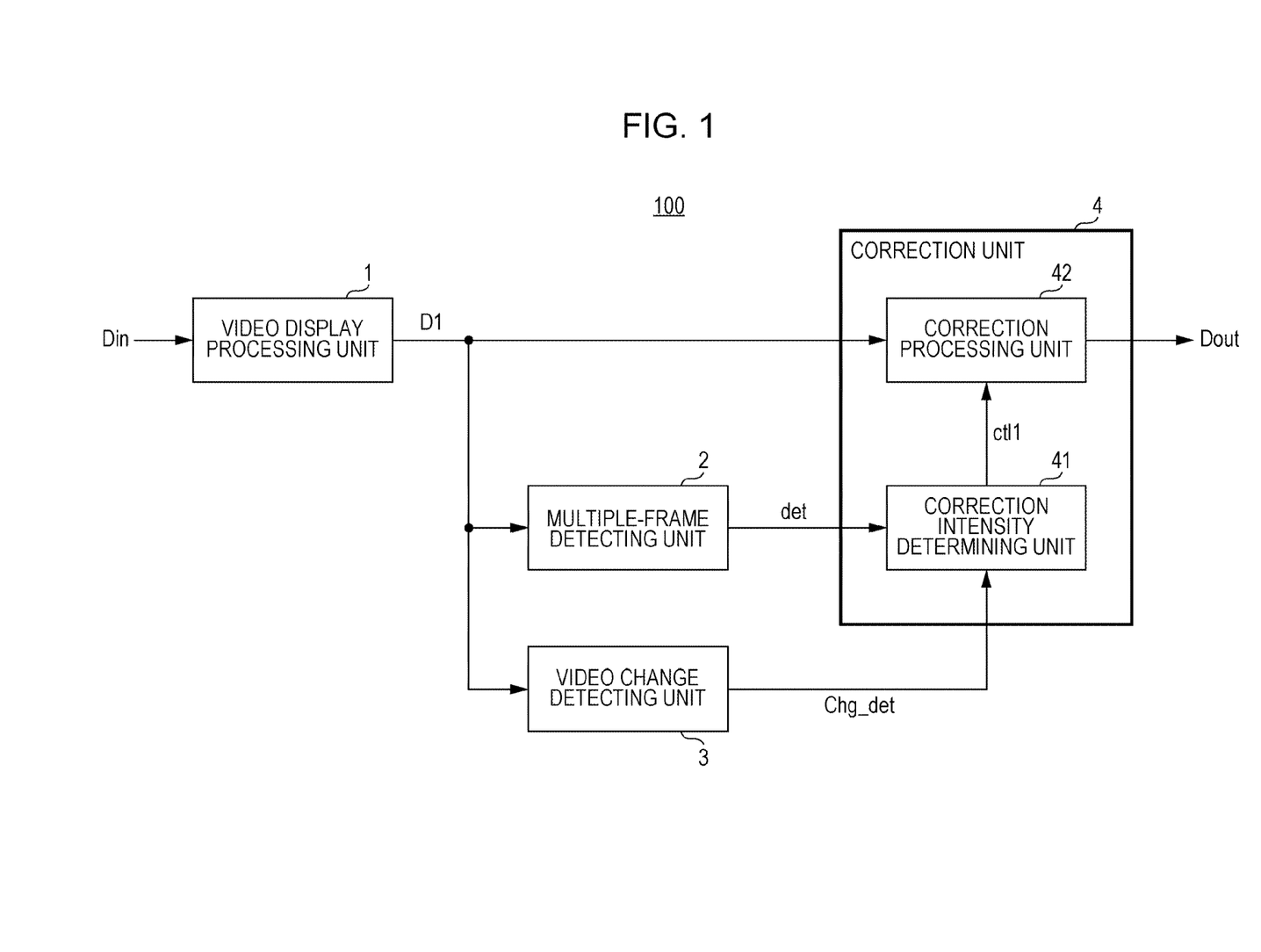
FIG. 1 is a view schematically illustrating the configuration of a video processing device 100 according to a first embodiment.

FIG. 1 is a view schematically illustrating the configuration of a video processing device 100 according to the first embodiment.

As illustrated in FIG. 1, the video processing device 100 includes a video display processing unit 1, a multiple-frame detecting unit 2, a video change detecting unit 3, and a correction unit 4.

The video display processing unit 1 receives a video signal Din capable of forming a plurality of unit images (for example, frame images or field images). The video display processing unit 1 performs a process of adjusting, for example, video size and/or frame rate on the video signal Din, which is input, so as to obtain a processed signal, and the video display processing unit 1 outputs the processed signal as a video signal D1 to the multiple-frame detecting unit 2, the video change detecting unit 3, and the correction unit 4.

The multiple-frame detecting unit 2 receives the video signal D1 output from the video display processing unit 1 and performs a prescribed detection process on the video signal D1. The process performed by the multiple-frame detecting unit 2 requires the time corresponding to a video signal for a plurality of unit images (for example, a plurality of frame images) in order to acquire a detection result. The multiple-frame detecting unit 2 incorporates information showing a result of the detection process into a detection signal det and outputs the detection signal det to a correction intensity determining unit 41 of the correction unit 4. For example, when the multiple-frame detecting unit 2 performs a face area detection process as the detection process, the multiple-frame detecting unit 2 performs the face area detection process on unit images (for example, frame images) formed by the video signal D1, thereby detecting (specifying) a face area of the unit images. Then, the multiple-frame detecting unit 2 incorporates information specifying the face area, which is detected on the unit images, for example, information indicating coordinates and the like of the face area of the unit images, into the detection signal det. Then, the multiple-frame detecting unit 2 outputs the detection signal det to the correction intensity determining unit 41 of the correction unit 4.

The video change detecting unit 3 receives the video signal D1 output from the video display processing unit 1 and detects a video change on the basis of the video signal D1. Then, the video change detecting unit 3 incorporates information including the detection result of the video change into a detection signal Chg_det and outputs the detection signal Chg_det to the correction intensity determining unit 41.

The correction unit 4 includes the correction intensity determining unit 41 and a correction processing unit 42.

The correction intensity determining unit 41 receives the detection signal det output from the multiple-frame detecting unit 2 and the detection signal Chg_det output from the video change detecting unit 3. The correction intensity determining unit 41 determines the intensity (correction intensity) of the correction process on the video signal D1 for each of the pixels (or image areas) of the unit images formed by the video signal D1 on the basis of the detection signal det and the detection signal Chg_det. Then, the correction intensity determining unit 41 outputs a signal ctl1 to the correction processing unit 42. The signal ctl1 includes the correction intensity determined for each of the pixels (or the image areas) of the unit images formed by the video signal D1 and information relating to each of the pixels (or the image areas) of the unit image corresponding to the correction intensity.

The multiple-frame detecting unit 42 receives the video signal D1 output from the video display processing unit 1 and the signal ctl1 output from the correction intensity determining unit 41. The correction processing unit 42 obtains the correction intensity and each of the pixels (or the image areas) corresponding to the correction intensity from the signal ctl1. Then, the correction processing unit 42 performs, on each of the pixels (or the image areas) of the unit images formed by the video signal D1, a correction process with the correction intensity (correction intensity determined by the correction intensity determining unit 41) corresponding to each of the pixels (or the image areas). That is, the correction processing unit 42 performs the correction process on the video signal D1 with the correction intensity determined by the correction intensity determining unit 41 to obtain a processed video signal. Then, the correction processing unit 42 outputs the processed video signal as a video signal Dout.

1.2: Operation of Video Processing Device

Operation of the video processing device 100 configured as described above will be described below.

Note that for the sake of description, the unit image is hereinafter defined as a frame image, and a case where the multiple-frame detecting unit 2 performs a process of detecting a face area will be described.

Figure 2:
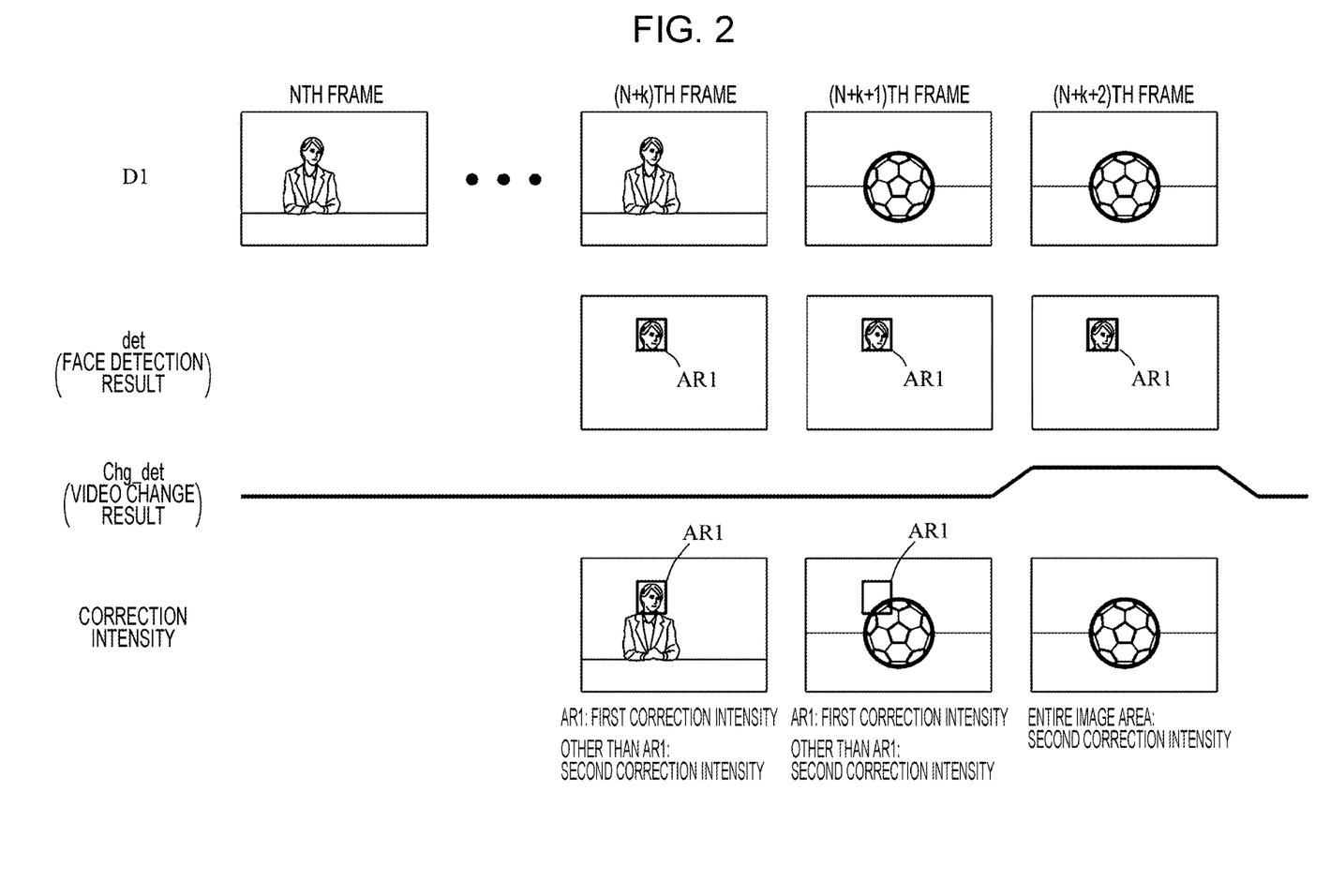
FIG. 2 is a time-sequence diagram illustrating a video signal D1, a detection signal det acquired by a multiple-frame detecting unit 2, a detection signal Chg_det acquired by a video change detecting unit 3, and a correction intensity determined by a correction intensity determining unit 41.

FIG. 2 is the time-sequence diagram illustrating the video signal D1, the detection signal det acquired by the multiple-frame detecting unit 2, the detection signal Chg_det acquired by the video change detecting unit 3, and the correction intensity determined by the correction intensity determining unit 41.

The video display processing unit 1 performs a process of adjusting video size and/or frame rate on the video signal Din capable of forming a plurality of frame images to obtain a processed signal and outputs the processed signal as the video signal D1 to the multiple-frame detecting unit 2, the video change detecting unit 3, and the correction processing unit 42 of the correction unit 4.

The multiple-frame detecting unit 2 performs a face area detection process on the video signal D1. Note that the time corresponding to the video signal D1 for k frames is required to acquire a detection result of the face area.

As illustrated in FIG. 2, the multiple-frame detecting unit 2 takes the time corresponding to the video signal D1 from the Nth frame (N: integer) to the (N+k−1)th frame (k: natural number, k≥2) to perform the face area detection process on the frame image of the Nth frame. Then, as illustrated in FIG. 2, the multiple-frame detecting unit 2 detects the face area as an area AR1 at a time point corresponding to the (N+k)th frame. The multiple-frame detecting unit 2 outputs information regarding the area AR1, which is the face area detected, as the detection signal det to the correction intensity determining unit 41 of the correction unit 4.

The video change detecting unit detects a video change by using the video signal D1. For example, when in a frame image of a current frame and a frame image in a frame directly preceding the current frame, an integrated value of differences between pixel values of pixels having identical coordinates in the images is larger than a prescribed value, the video change detecting unit 3 determines the occurrence of a video change (scene change). In the case of the video signal D1 of FIG. 2, the video change detecting unit 3 determines the occurrence of the video change (scene change) when the current frame is an (N+k+1)th frame, and as illustrated in FIG. 2, the video change detecting unit 3 generates the detection signal Chg_det showing the determination result and outputs the detection signal Chg_det to the correction intensity determining unit 41. Note that the signal value of the detection signal Chg_det transitions to a high level when the video change (scene change) is detected, whereas the signal value of the detection signal Chg_det transitions to a low level when no video change (scene change) is detected.

(Processing of (N+k)th Frame):

First, processing of the (N+k)th frame will be described.

The correction intensity determining unit 41 determines the intensity (correction intensity) of the correction process on the video signal D1 for each of the pixels (or image areas) of the frame images formed by the video signal D1 on the basis of the detection signal det and the detection signal Chg_det.

In the case of FIG. 2, the correction intensity determining unit 41 detects on the basis of the detection signal det that the area AR1 in the (N+K)th frame is an image area identified as a face area, the correction intensity determining unit 41 sets the correction intensity of the area AR1 to a first correction intensity, and the correction intensity determining unit 41 sets the correction intensity of an image area other than the area AR1 to a second correction intensity. Then, the correction intensity determining unit 41 incorporates information regarding the correction intensities set as described above and information regarding the corresponding image areas into the signal ctl1 and outputs the signal ctl1 to the correction processing unit 42.

The correction processing unit 42 obtains the correction intensities and the pixels (or the image areas) corresponding to the correction intensities from the signal ctl1. Then, the correction processing unit 42 performs, on each of the pixels (or the image areas) of the unit images formed by the video signal D1, a correction process with the correction intensity (correction intensity determined by the correction intensity determining unit 41) corresponding to each of the pixels (or the image area).

In the case of FIG. 2, the correction processing unit 42 obtains, from the signal ctl1 in the (N+k)th frame, (1) a first correction intensity as a correction intensity of the area AR1, and (2) a second correction intensity as a correction intensity of an image area other than the area AR1.

Then, the correction processing unit 42 performs (1) the correction process with the first correction intensity on the video signal D1 corresponding to each of the pixels included in the area AR1 of a frame image of the (N+k)th frame formed by the video signal D1, and (2) the correction process with the second correction intensity on the video signal D1 corresponding to each of the pixels included in the image area other than the area AR1 of the frame image of the (N+k)th frame formed by the video signal D1.

The correction processing unit 42 outputs a video signal after the correction process as a video signal Dout.

In the video processing device 100, for example, (1) in the area AR1 identified as the face area, the first correction intensity is set such that a weak enhancement process is performed, and (2) in an image area which is an image area other than the area AR1 and is not identified as the face area, the second correction intensity is set such that a strong enhancement process is performed.

Alternatively, in the video processing device 100, for example, (1) in the area AR1 identified as the face area, the first correction intensity is set such that a strong enhancement process is performed so that wrinkles and the like of the face do not stand out, and (2) in an image area which is an image area other than the area AR1 and is not identified as the face area, the second correction intensity is set such that a weak enhancement process is performed (or the enhancement process is trot performed).

This enables the video processing device 100 to perform an optimal correction process on the image area which is not the face area while performing an optimal correction process on the face area.

(Processing of (N+k+1)th Frame, (N+K+2)th Frame):

Next, processing of the (N+k+1)th frame and the (N+k+2)th frame will be described.

In the case of FIG. 2, the video change detecting unit 3 obtains an integrated value of differences between pixel values of pixels having identical coordinates in a frame image of the (N+k+1)th frame which is a current frame and a frame image of the (N+k)th frame which is a frame directly preceding the current frame, and the video change detecting unit 3 determines that the integrated value, which is obtained, is greater than a prescribed value. Then, the video change detecting unit 3 determines the occurrence of a video change (scene change) in the (N+k+1)th frame, and as illustrated in FIG. 2, at the timing of the (N+k+2)th frame, the video change detecting unit 3 causes the signal value of the detection signal Chg_det to transition to a high level and outputs the detection signal Chg_det the correction intensity determining unit 41.

On the (N+k+1)th frame, the correction intensity determining unit 41 and the correction processing unit 42 perform processing similar to that performed on (N+k)th frame.

The correction intensity determining unit 41 detects the occurrence of a video change (scene change) in the (N+k+2)th frame on the basis of the detection signal Chg_det, and the correction intensity determining unit 41 sets the correction intensity of the entire image area of the (N+k+2)th frame image of the video signal D1 to the second correction intensity. Then, the correction intensity determining unit 41 incorporates information regarding the image area in which the correction intensity is set and information regarding the correction intensity into the signal ctl1, and the correction intensity determining unit 41 outputs the signal ctl1 to the correction processing unit 42.

The correction processing unit 42 obtains the correction intensity and each of the pixel (or the image areas) corresponding to the correction intensity from signal ctl1. Then, the correction processing unit 42 acquires the second correction intensity as the correction intensity of the entire image area from the signal ctl1 in the (N+k+2)th frame.

Then, the correction processing unit 42 performs a correction process with the second correction intensity on the video signal D1 corresponding to each of the pixels of the entire image area of the frame image of the (N+k+2)th frame formed by the video signal D1.

This enables the video processing device 100 to property prevent a correction process with an inappropriate correction intensity from being performed on the image area identified as the face area in a preceding frame in the case of the occurrence of the video change (scene change).

That is, in the video processing device 100, the correction process can be appropriately performed on the video signal even in the case of the occurrence of the video change (scene change).

First Variation

Next, a first variation of the first embodiment will be described.

Note that the same components as those in the embodiments described above have the same reference characters, and detailed description thereof will be omitted.

Figure 3:
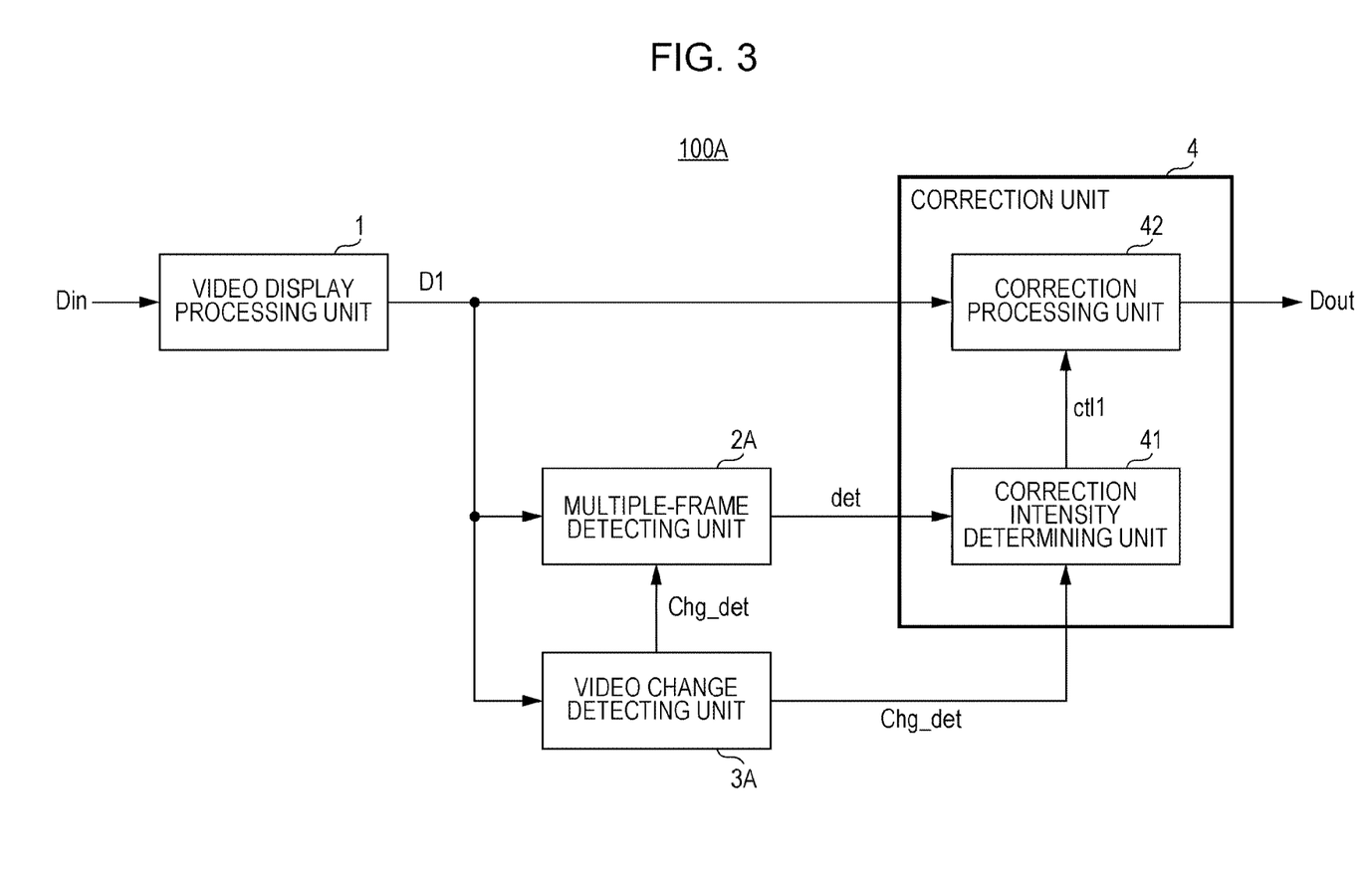
FIG. 3 is a view schematically illustrating the configuration of a video processing device 100A of a first variation of the first embodiment.

FIG. 3 is a view schematically illustrating the configuration of a video processing device 100A of the present variation.

Figure 4:
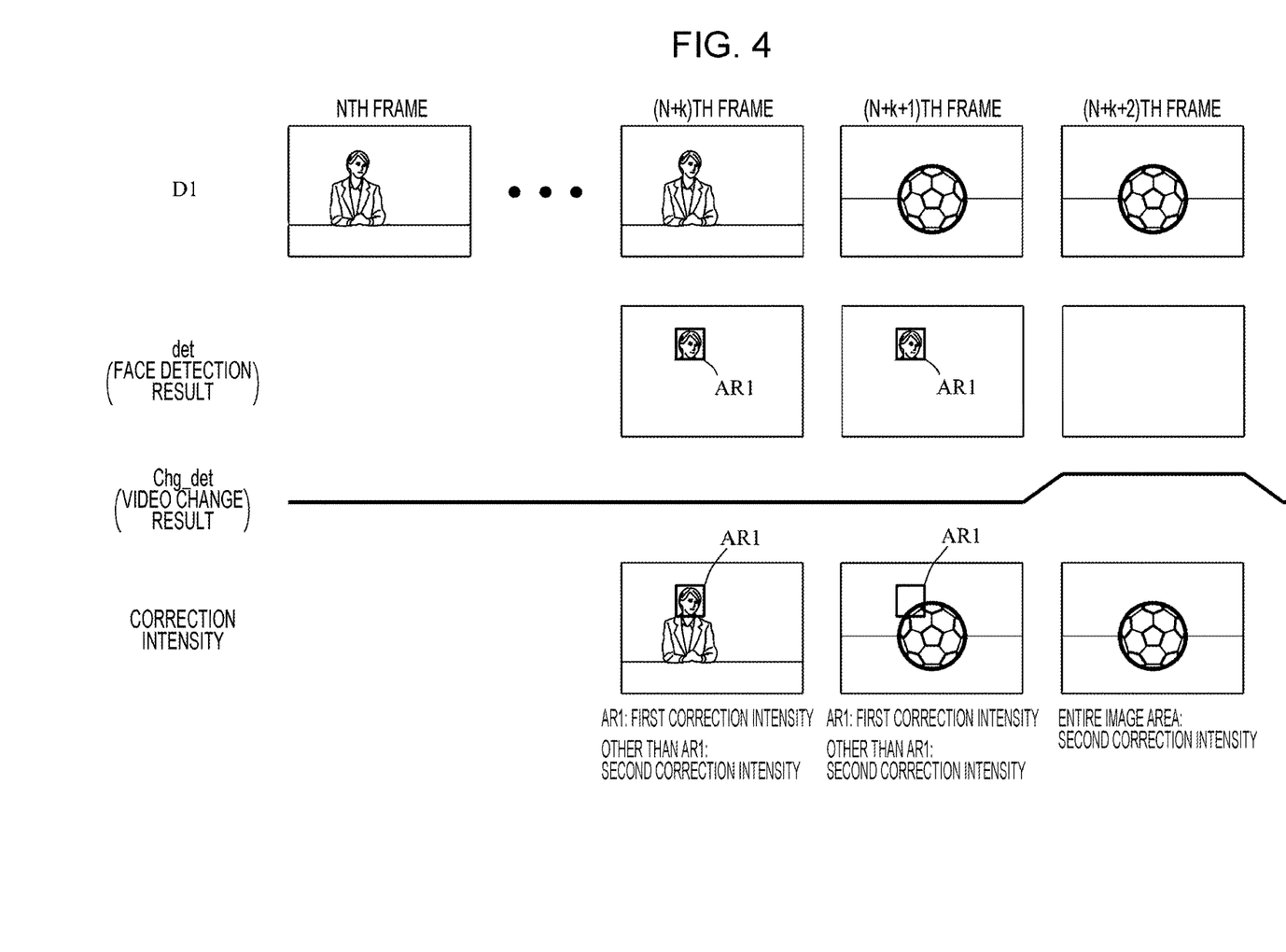
FIG. 4 is a time-sequence diagram illustrating a video signal D1, a detection signal det acquired by a multiple-frame detecting unit 2, a detection signal Chg_det acquired by a video change detecting unit 3A, and a correction intensity determined by a correction intensity determining unit 41 of the video processing device 100A of the first variation of the first embodiment.

FIG. 4 is a time-sequence diagram illustrating a video signal D1, a detection signal det acquired by a multiple-frame detecting unit 2, a detection signal Chg_det acquired by a video change detecting unit 3A, and a correction intensity determined by a correction intensity determining unit 41 of the video processing device 100A of the present variation.

As illustrated in FIG. 3, the video processing device 100A of the present variation has the configuration of the video processing device 100 of the first embodiment, wherein the multiple-frame detecting unit 2 is replaced with a multiple-frame detecting unit 2A, and the video change detecting unit 3 is replaced with the video change detecting unit 3A.

In the video processing device 100A of the present variation, the detection signal Chg_det acquired by the video change detecting unit 3A is also output to the multiple-frame detecting unit 2A. In this regard, the video processing device 100A of the present variation is different from the video processing device 100 of the first embodiment.

The multiple-frame detecting unit 2A receives the video signal D1 and the detection signal Chg_det output from the video change detecting unit 3A. When the multiple-frame detecting unit 2A detects the occurrence of a video change (scene change) on the basis of the detection signal Chg_det, the multiple-frame detecting unit 2A stops the detection process (a detection process which requires a video signal of a plurality of frames in order to obtain a process result) which is being performed.

As illustrated in FIG. 4, the signal level of the detection signal Chg_det is a high level in the (N+k+2)th frame, and therefore, the multiple-frame detecting unit 2A detects the occurrence of a video change (scene change) and stops the detection process of the face area. As a result, as illustrated in FIG. 4, the detection signal, det becomes, in the (N+k+2)th frame, a signal which does not specify the area AR1 detected as the face area.

According to the processes described above, the video processing device 100A of the present variation stops (resets), after the occurrence of the video change (scene change), the detection process performed by the multiple-frame detecting unit 2A, thereby preventing the detection process from continuing unnecessarily. Moreover, this enables the multiple-frame detecting unit 2A to perform a new start of the detection process directly after the scene change, and therefore, it is possible to more quickly acquire a detection result of the multiple-frame detecting unit 2A with respect to the video after the scene change.

Second Variation

Next, a second variation of the first embodiment will be described.

Note that the same components as those in the embodiments described above have the same reference characters, and detailed description thereof will be omitted.

The video processing device of the present variation has a configuration similar to the configuration of the video processing device 100 of the first embodiment.

In the video processing device of the present variation, a video change detecting unit 3 performs a camera work detection process.

Upon detecting camera work (for example, a zoom operation and/or a panning operation) on the basis of an input video signal Din, the video change detecting unit 3 causes a detection signal Chg_det to transition to a high level and outputs the detection signal Chg_det.

Note that in the video processing device of the present variation, detection of camera work may be performed in such a manner that the video processing device of the present variation includes an image capturing unit (not shown), and by using a control unit (not shown) configured to control the image capturing unit, the video change detecting unit 3 acquires a signal showing camera work, and on the basis of the signal, the camera work is detected.

Moreover, in the video processing device of the present variation, the video change detecting unit 3 may perform prescribed image processing to detect the camera work.

Figure 5:
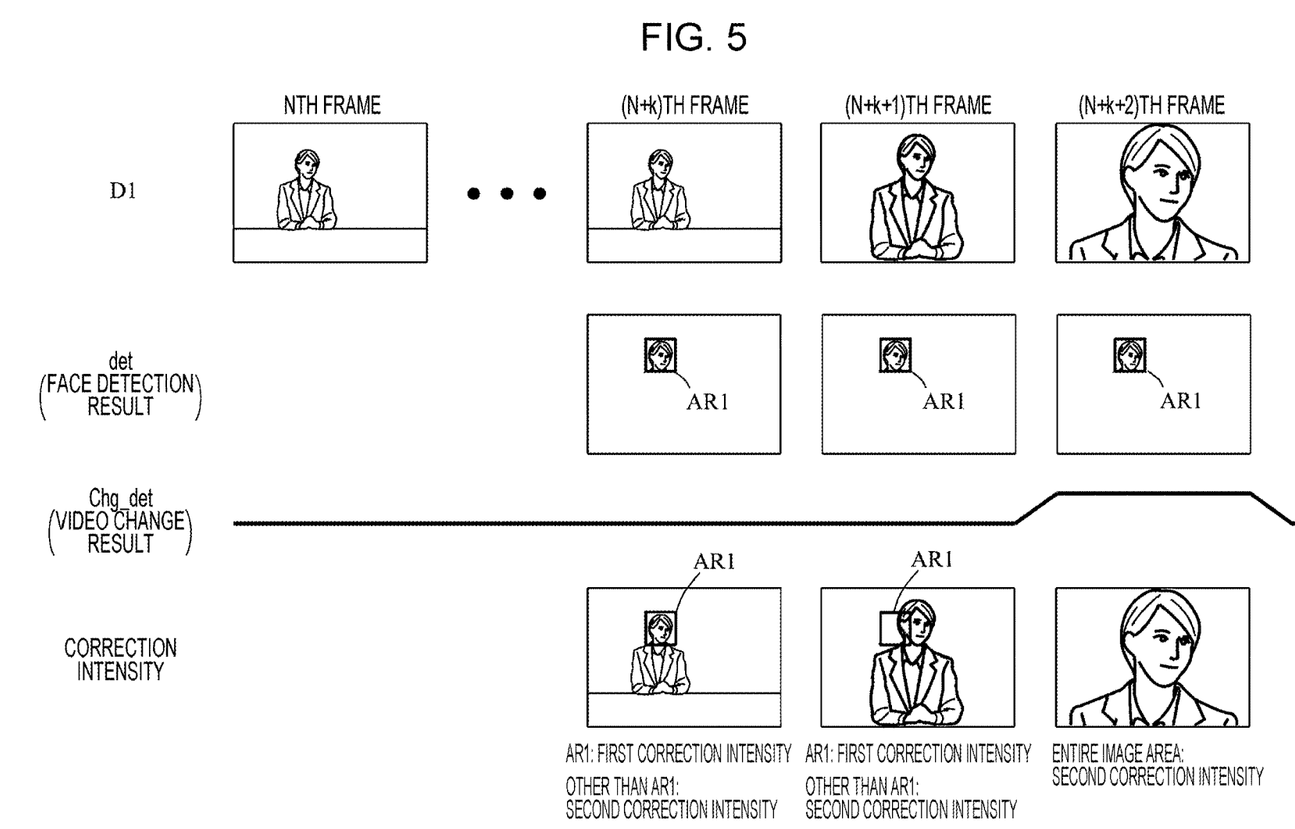
FIG. 5 is a time-sequence diagram illustrating a video signal D1, a detection signal det acquired by a multiple-frame detecting unit 2, a detection signal Chg_det acquired by a video change detecting unit 3, and a correction intensity determined by a correction intensity determining unit 41 of the video processing device of a second variation of the first embodiment.

FIG. 5 is a time-sequence diagram illustrating a video signal D1, a detection signal det acquired by a multiple-frame detecting unit 2, a detection signal Chg_det acquired by a video change detecting unit 3, and a correction intensity determined by a correction intensity determining unit 41 of the video processing device of the present variation. Note that in FIG. 5, the video signal D1 from the Nth frame to the (N+k)th frame is the same as that of the first embodiment.

As illustrated in FIG. 5, a zoom operation is performed from the (N+k)th frame to the (N+k+2)th frame.

In the case of FIG. 5, the video change detecting unit 3 detects the camera work (zoom operation) at a timing at which the processing of the frame N+k+1 ends, and in and after the (N+k+2)th frame, the correction process with the second correction intensity is performed on the entire image area.

As described above, in the video processing device of the present variation, it is possible to properly prevent a correction process with an inappropriate correction intensity from being performed on the image area identified as the face area in a preceding frame in the case of the occurrence of the video change due to camera work.

That is, in the video processing device of the present variation, the correction process can be appropriately performed on the video signal even in the case of the occurrence of the video change due to camera work.

Note that, the video change detecting unit 3A of the video processing device 100A of the first variation may perform the detection process of the camera work in a similar manner to the video change detecting unit 3 of the present variation.

The video change detecting unit 3 may perform a motion vector detection process.

In this case, the video change detecting unit 3 divides the frame image formed by the video signal D1 into blocks each having a prescribed size, calculates (detects), for each of the blocks, vector data representing a direction and an extent of movement as compared to preceding and following frame images, and determines whether or not the vector data which is detected is greater then a prescribed value. As a result of the determination, (1) if the vector data, which is detected, is greater than the prescribed value, it is determined that a video change is detected, and the video change detecting unit 3 causes the detection signal Chg_det to transition to a high level and outputs the detection signal Chg_det, whereas (2) if the vector data, which is detected, is less than or equal to the prescribed value, it is determined that no video change is detected, and the video change detecting unit 3 causes the detection signal Chg_det to transition to a low level and outputs the detection signal Chg_det.

In this way, the video processing device of the present variation may detect the video change by the motion vector detection process.

The video processing device of the present variation may have a configuration similar to the configuration of the first variation, and the video change detecting unit 3A may perform the motion vector detection process.

The video change detecting unit 3 may perform a video change amount calculating process.

In this case, for pixels at a plurality of prescribed coordinate positions on the frame image formed by the video signal D1, the video change detecting unit 3 calculates an extent to which the pixel value (signal value) changed as compared to a frame image directly preceding the frame image formed by the video signal D1 (for example, a difference between luminance values of the pixels or a difference between RGB values), and the video change detecting unit 3 determines whether or not a difference value which is calculated is greater than a prescribed value. As a result of the determination, (1) if the difference value is greater than the prescribed value, it is determined that a video change is detected, and the video change detecting unit 3 causes the detection signal Chg_det to transition to a high level and outputs the detection signal Chg_det, whereas (2) if the difference value is less than or equal to the prescribed value, it is determined that no video change is detected, and the video change detecting unit 3 causes the detection signal Chg_det to transition to a low level and outputs the detection signal Chg_det.

In this way, the video processing device of the present variation may detect the video change by the video change amount calculation process.

Moreover, the video processing device of the present variation may have a configuration similar to the configuration of the first variation, and the video change detecting unit 3A may perform the video change amount calculating process.

Second Embodiment

Next, a second embodiment will be described.

Note that the same components as those in the embodiments described above have the same reference characters, and detailed description thereof will be omitted.

Figure 6:
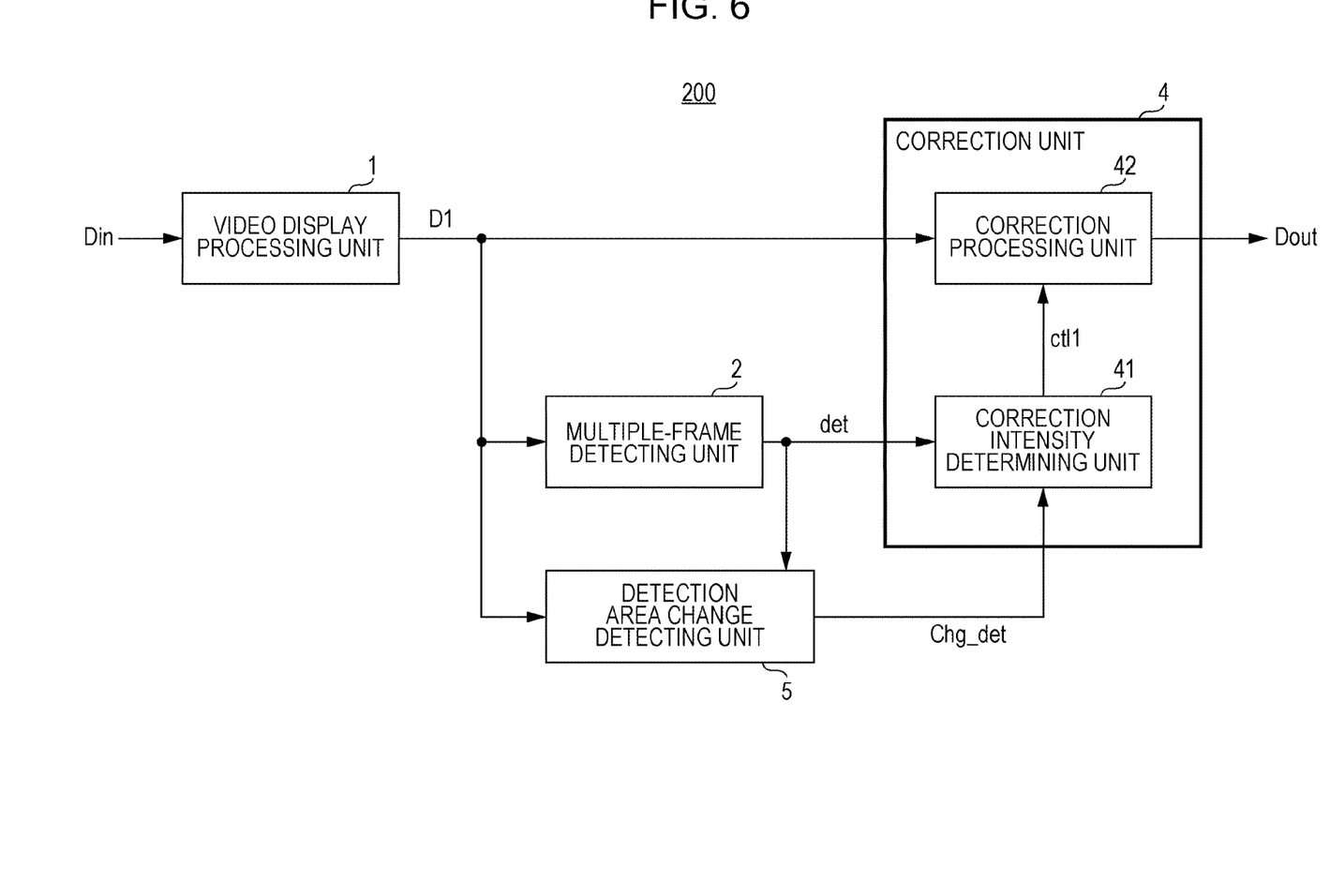
FIG. 6 is a view schematically illustrating the configuration of a video processing device 200 according to a second embodiment.

FIG. 6 is a view schematically illustrating the configuration of a video processing device 200 of the second embodiment.

The video processing device 200 of the second embodiment has the configuration of the video processing device 100 of the first embodiment, where the video change detecting unit 3 is replaced with a detection area change detecting unit 5.

The detection area change detecting unit 5 receives a video signal D1 and a detection signal det output from a multiple-frame detecting unit 2. The detection area change detecting unit 5 specifies an image area (for example, the area AR1 of FIG. 2) detected by the multiple-frame detecting unit 2 on the basis of the detection signal det. Then, in the image area (for example, the area AR1 in FIG. 2), which is specified, the detection area change detecting unit 5 calculates a difference between a frame image of a current frame formed by the video signal D1 and a frame image of a frame directly preceding the current frame. That is, the detection area change detecting unit 5 acquires difference values of pixel values of pixels included in the image area (for example, the area AR1 in FIG. 2), which is specified, between the frame image of the current frame and the frame image of the frame directly preceding the current frame. Then, for the pixels included in the image area (for example, the area AR1 in FIG. 2), which is specified, the detection area change detecting unit 5 integrates the difference values of the pixels which are acquired. If an integrated value is greater than a prescribed value, the video change detecting unit 5 determines that a video change is detected, and the video change detecting unit 5 causes a detection signal Chg_det to transition to a high level and outputs the detection signal Chg_det. If the integrated value is less than or equal to the prescribed value, the video change detecting unit 5 determines that no video change is detected, and the video change detecting unit 5 causes the detection signal Chg_det to transition to a low level and outputs the detection signal Chg_det.

That is, if a change in the image area (for example, the area AR1 of FIG. 2) detected by the multiple-frame detecting unit 2 is large, the video change detecting unit 5 causes the detection signal Chg_det to transition to a high level and outputs the detection signal Chg_det.

This enables the video processing device 200 to properly prevent a correction process with an inappropriate correction intensity from being performed an the image area identified as the face area in a preceding frame in the case of the occurrence of the video change (for example, scene change).

That is, in the video processing device 200, the correction process can be appropriately performed on the video signal even in the case of the occurrence of the video change (for example, scene change).

Moreover, in the video processing device 200, a change in the image area (for example, the area AR1 of FIG. 2) detected by the multiple-frame detecting unit 2 is detected, and therefore, the computation amount can be reduced as compared to the case where detection of the video change (for example, scene change) is performed on the entire image area.

First Variation

Next, a first variation of the second embodiment will be described.

Note that the same components as those in the embodiments described above have the same reference characters, and detailed description thereof will be omitted.

Figure 7:
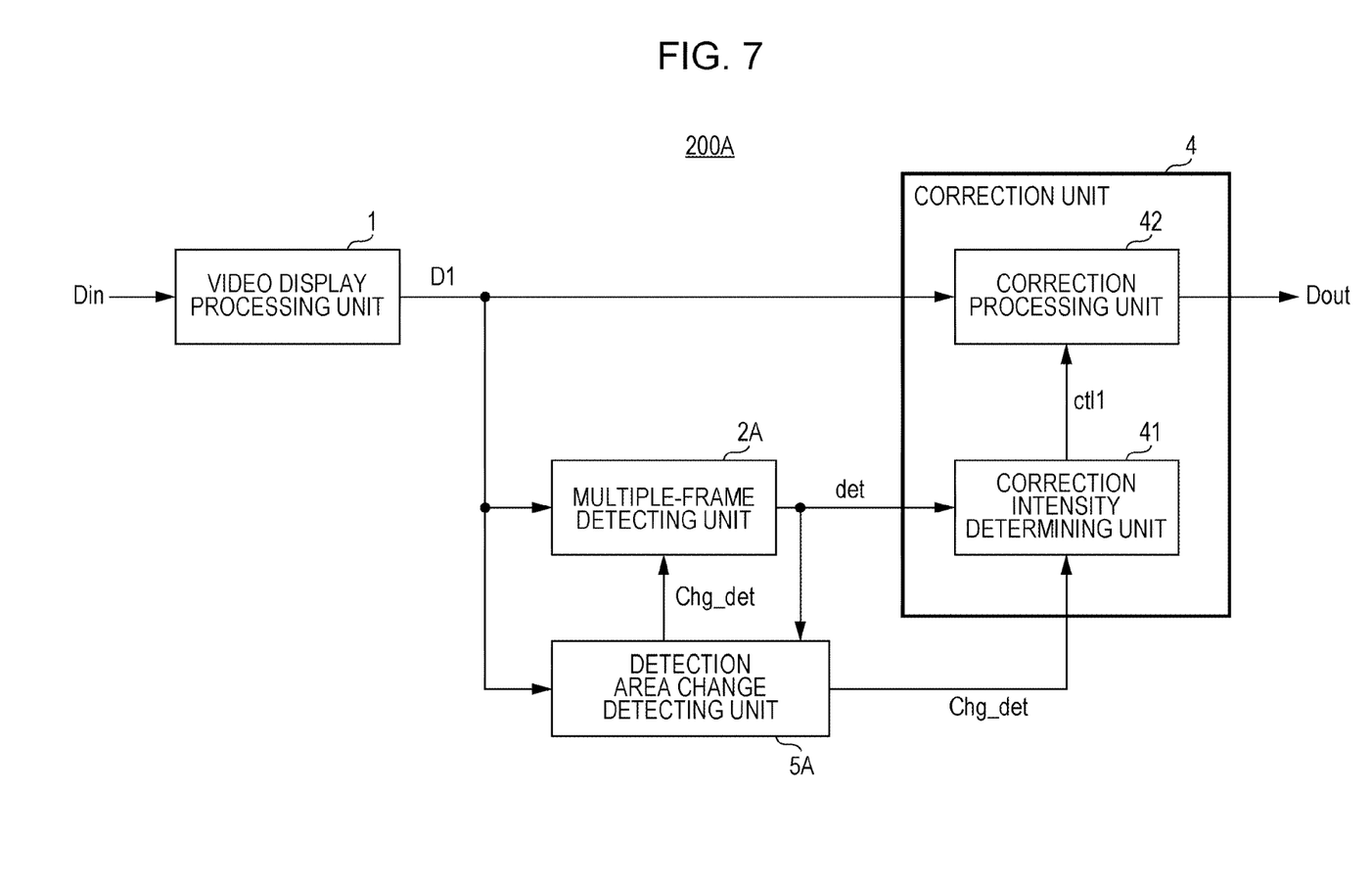
FIG. 7 is a view schematically illustrating the configuration of a video processing device 200A of a first variation of the second embodiment.

FIG. 7 is a view schematically illustrating the configuration of a video processing device 200A of the present variation.

As illustrated in FIG. 7, the video processing device 200A of the present variation has the configuration of the video processing device 200 of the second embodiment, wherein the multiple-frame detecting unit 2 is replaced with a multiple-frame detecting unit 2A, and the detection area change detecting unit 5 is replaced with a detection area change detecting unit 5A.

In the video processing device 200A of the present variation, a detection signal Chg_det acquired by the detection area change detecting unit 5A is also output to the multiple-frame detecting unit 2A. In this regard, the video processing device 200A of the present variation is different from the video processing device 200 of the second embodiment.

The multiple-frame detecting unit 2A receives a video signal D1 and the detection signal Chg_det output from the video change detecting unit 3A. When the multiple-frame detecting unit 2A detects the occurrence of a video change (for example, scene change) on the basis of the detection signal Chg_det, the multiple-frame detecting unit 2A stops a detection process which is being performed (detection process which requires the time corresponding to a video signal for a plurality of frames in order to obtain a process result).

According to the processes described above, the video processing device 200A of the present variation stops (resets), after the video change (for example, scene change) occurred, the detection process performed by the multiple-frame detecting unit 2A, thereby preventing the detection process from continuing unnecessarily.

Other Embodiments

In the embodiments (including the variations), it has been described that the multiple-frame detecting unit 2, 2A performs the process of detecting the face area. However, the present invention is not limited to the embodiments. The multiple-frame detecting unit 2, 2A may perform other processes. For example, the multiple-frame detecting unit 2, 2A may be a unit which performs a process of detecting an image area in which characters (text) are displayed. In this case, a video processing device may set a correction intensity in the image area displaying the characters (text) so that a correction process is performed such that the characters are more legibly displayed. For example, in order to render the characters (text) legible, a correction process of performing edge enhancement may be performed on the image area displaying the characters (text) so that overshoot or undershoot is provided to the contour portion of the characters.

Moreover, a relationship of the magnitude between a correction intensity deg1 of the correction process performed on the image area (detected image area), which is detected by the prescribed detection process performed by the multiple-frame detecting unit 2, 2A, and a correction intensity deg2 of the correction process performed on an image area other than the detected image area may be deg1≥deg2 or deg1≤deg2. Note that as the correction intensity increases, the intensity of the correction process which is to be executed increases.

Moreover, the correction intensity deg1 of the correction process performed on the detected image area does not necessarily have to be a fixed value. For example, when prescribed threshold values are th1 and th2 (th2>th1), the correction intensity deg1 may be a value which is in the following relationship:

th1<deg1<th2

Moreover, the correction intensity deg2 of the correction process performed on an area other than the detected image area does not necessarily have to be a fixed value. For example, when prescribed threshold values are th3 and th4 (th4>th3), the correction intensity deg1 may be a value which is in the following relationship:

th3<deg2<th4

Moreover, in the embodiments (including the variations), it has been described that the video processing device processes unit images as frame images. However, the present invention is not limited to the embodiments. The video processing device may process unit images as field images.

Moreover, as illustrated in FIGS. 2, 4, and 5, in the embodiments (including the variations), a detection timing of the detection signal Chg_det is a timing of the (N+k+2)th frame, and therefore, the correction process with an appropriate correction intensity is not performed on the video signal of the (N+k+1)th frame. In order to avoid this situation, in the video processing device, for example, the video signal D1 may be delayed by the time corresponding to one frame, and the correction process with the appropriate correction intensity may be executed starting from the (N+k+1)th frame.

Moreover, some or all of the embodiments (including the variations) may be combined to realize the video processing device.

Moreover, some or all of the video processing devices of the embodiments (including the variations) may be realized as integrated circuits (for example, LSIs, system LSIs, and the like).

Some or all of the processes of each of functional blocks of the embodiments may be realized by programs. Some or all of the processes of the functional blocks of the embodiments may be performed by a central processing unit (CPU) of a computer. Moreover, programs for performing each process may be stored in memory devices such as hard disks and ROMs, and the central processing unit (CPU) may read the programs from the ROMs or RAMs and execute the programs.

Moreover, each process of the embodiments may be realized by hardware or software (including a case of realization together with an operating system (OS)), middleware, or prescribed libraries). Moreover, each process may be realized by a mixed process of software and hardware.

Note that when the image processing system and the image processing device according to the embodiments are realized by hardware, timing adjustment for performing each process has, of course, to be performed. In the embodiments, for the sake of description, details of the timing adjustment of a various types of signals which occur in actual hardware design are omitted. Moreover, a delay device, and the like for performing the timing adjustment are omitted in the drawings.

Moreover, the order of performing of the process methods of the embodiments is not necessarily limited to the description of the embodiments. The order of execution may be exchangeable without departing from the spirit of the invention.

Computer programs for causing the computer to execute the methods described above and computer readable recording media storing the programs are within the scope of the present invention. Here, examples of the computer readable recording media include flexible disks, hard disks, CD-ROMs, MOs, DVDs, large-capacity DVDs, next-generation DVDs, and semiconductor memories.

The computer programs are not limited to programs stored in the recording media but may be programs transmitted via, for example, a network represented by an electrical communication line, a wireless or wired communication line, and the Internet.

Note that the specific configuration of the present invention is not limited to the embodiments described above but various modifications and corrections may be made without departing from the spirit of the invention.

Note

Note that the present invention may be described as follows.

A first invention is a video signal processing device for processing a video signal capable of forming a plurality of unit images, the video signal processing device including: a multiple-frame detecting unit; a video change detecting unit; and a correction unit.

The multiple-frame detecting unit performs a prescribed detection process which requires the time corresponding to a plurality of unit images of the video signal in order to obtain a process result, and the multiple-frame detecting unit acquires a detection target image area on the basis of a detection result.

The video change detecting unit detects a change in video between the unit images of the video signal.

The correction unit performs a correction process on the video signal on the basis of the detection result acquired by the multiple-frame detecting unit and a detection result acquired by the video change detecting unit.

(A) If no change in the video is detected by the video change detecting unit, the correction unit performs (A1) a correction process with a first correction intensity on the video signal corresponding to the detection target image area in the unit images of the detection process being performed by the multiple-frame detecting unit, and (A2) the correction process with a correction intensity different from the first correction intensity on the video signal corresponding to an image area other than the detection target image area.

(B) If a change in the video is detected by the video change detecting unit, the correction unit performs the correction process with a correction intensity different from the first correction intensity on the video signal.

This enables the video processing device, when a video change (for example, scene change) does not occur, to perform a correction process with an appropriate correction intensity on the video signal corresponding to the detection target image area, in the unit images of the detection process being performed by the multiple-frame detecting unit while performing a correction process with an appropriate correction intensity also on the video signal corresponding to an image area other than the detection target image area. Moreover, in the video processing device, in the case of the occurrence of the video change (for example, scene change), a correction process with the second correction intensity is performed on the video signal, and therefore, the correction process can be appropriately performed on the video signal even in the case of the occurrence of the video change (for example, scene change).

That is, in this video processing device, even when the multiple-frame detecting unit performs the prescribed detection process which requires the time corresponding to the plurality of unit images of the video signal to obtain the process result, it is possible to consistently perform an appropriate correction process on the video signal whether or not the video change (for example, scene change) occurs.

Note that "unit image" refers to one image displayed on a display device by a video signal (an image forming one display screen), and is a concept including a frame image and a field image.

When the first correction intensity is Hdeg1, and "the correction intensity different from the first correction intensity" (the correction intensity for the process in (A2)) which is the correction intensity of the correction process performed on the video signal corresponding to an image area other than the detection target image area is Hdeg2, the relationship $$Hdeg1 \leq Hdeg2$$

or $$Hdeg1 \geq Hdeg2$$

may be satisfied. Note that as the value of the correction intensity increases, the intensity of the correction process which is to be executed increases.

Moreover, when "the correction intensity different from the first correction intensity" (the correction intensity for the process in (B)) which is the correction intensity of the correction process performed on the video signal when the change in the video is detected by the video change detecting unit is Hdeg3, the relationship $$Hdeg1 \leq Hdeg3$$

or $$Hdeg1 \geq Hdeg3$$

may be satisfied. Note that as the value of the correction intensity increases, the intensity of the correction process which is to be executed increases.

The correction intensities Hdeg1, Hdeg2, and Hdeg3 are not necessarily fixed values. For example, when threshold values are th1, th2 (th2>th1), th3, th4 (th4>th3), th5, and th6 (th6>th5), the correction intensities Hdeg1, Hdeg2, and Hdeg3 may be correction intensities respectively satisfying the following relationships:

$$th1 < Hdeg1 < th2,$$

$$th3 < Hdeg2 < th4, \text{ and}$$

$$th5 < Hdeg3 < th6$$

The correction intensities Hdeg2 and Hdeg3 may be the same value (the same correction intensity).

A second invention is a first invention, wherein the multiple-frame detecting unit stops performing the prescribed detection process when the change in the video is detected by the video change detecting unit.

This enables the video processing device, after the video change (for example, scene change) occurred, to stop (reset) the detection process performed by the multiple-frame detecting unit, thereby preventing the detection process from continuing unnecessarily.

A third invention is the first or second invention, wherein the video change detecting unit acquires an integrated difference value by integrating difference values which are values of differences between the unit images in terms of values of pixels included in the unit images, and the video change detecting unit detects the change in the video between the unit images in the video signal on the basis of the integrated difference value which is acquired.

This enables the video processing device to detect the change in the video between unit images of the video signal by using the integrated difference value.

A fourth invention is the first or second invention, wherein the video change detecting unit performs a motion vector detection process by using the unit images and detects the change in the video between unit images of the video signal on the basis of a result of the motion vector detection process.

This enables the video processing device to detect the change in the video between unit images of the video signal by using the motion vector detection process.

A fifth invention is the first or second invention, wherein the multiple-frame detecting unit acquires an image area of the unit images detected by the detection process as a detected image area.

The video change detecting unit integrates difference values which are values of differences between the unit images in terms of values of pixels included in the unit images and included in the detected image area acquired by the multiple-frame detecting unit to obtain an integrated difference value, and the video change detecting unit detects the change in the video between the unit images in the video signal on the basis of the integrated difference value which is acquired.

This configuration enables the video processing device to detect the change in the video between the unit images of the video signal by using the motion vector detection process.

The video processing device detects a change in the image area detected by the multiple-frame detecting unit, and therefore the computation amount can be reduced as compared to the case where detection of a video change is performed on the entire image area.

INDUSTRIAL APPLICABILITY

According to the present invention, it is possible to realize a video processing device which enables a correction process to be appropriately performed on a video signal even in the case of performing a detection process which requires the video signal for a plurality of frames. Therefore, the present invention is useful in and may be implemented in the industrial field relating to video.

REFERENCE SIGNS LIST 100, 100A, 200, 200A VIDEO PROCESSING DEVICE
1 VIDEO DISPLAY PROCESSING UNIT
2, 2A MULTIPLE-FRAME DETECTING UNIT
3, 3A VIDEO CHANGE DETECTING UNIT
4 CORRECTION UNIT
41 CORRECTION INTENSITY DETERMINING UNIT
42 CORRECTION PROCESSING UNIT
5, 5A DETECTION AREA CHANGE DETECTING UNIT

The invention claimed is:

1. A video signal processing device for processing a video signal capable of forming a plurality of unit images, the video signal processing device comprising:
   a multiple-frame detecting circuit to perform a prescribed detection process which requires a time corresponding to the plurality of unit images of the video signal to obtain a process result, and to acquire a detection target image area on the basis of a detection result;
   a video change detecting circuit to detect a change in video between the unit images of the video signal; and
   a correction circuit to perform a correction process on the video signal on the basis of the detection result acquired by the multiple-frame detecting circuit and a detection result acquired by the video change detecting circuit, wherein
   (A) if no change in the video is detected by the video change detecting circuit, the correction circuit performs
   (A1) the correction process with a first correction intensity on the video signal corresponding to the detection target image area in the unit images of the detection process being performed by the multiple-frame detecting circuit, and
   (A2) the correction process with a correction intensity different from the first correction intensity on the video signal corresponding to an image area other than the detection target image area, whereas
   (B) if a change in the video is detected by the video change detecting circuit, the correction circuit performs the correction process with a correction intensity different from the first correction intensity on the video signal.

2. The video processing device according to claim 1, wherein
   the multiple-frame detecting circuit stops performing the prescribed detection process when the change in the video is detected by the video change detecting circuit.

3. The video processing device according to claim 1, wherein
   the video change detecting circuit acquires an integrated difference value by integrating difference values which are values of differences between the unit images in terms of values of pixels included in the unit images, and the video change detecting circuit detects the change in the video between the unit images in the video signal on the basis of the integrated difference value which is acquired.

4. The video processing device according to claim 1, wherein
   the video change detecting circuit performs a motion vector detection process by using the unit images and detects the change in the video between unit images of the video signal on the basis of a result of the motion vector detection process.

5. The video processing device according to claim 1, wherein
   the multiple-frame detecting circuit acquires, an image area of the unit images detected by the detection process as a detected image area, and
   the video change detecting circuit integrates difference values which are values of differences between the unit images in terms of values of pixels included in the unit images and included in the detected image area acquired by the multiple-frame detecting circuit to obtain an integrated difference value, and the video change detecting circuit detects the change in the video between the unit images in the video signal on the basis of the integrated difference value which is acquired.

6. A video signal processing device for processing a video signal capable of forming a plurality of unit images, the video signal processing device comprising:
   a processor; and
   a memory associated with the processor; wherein
   the processor executes multiple-frame detecting process which performs a prescribed detection process which requires a time corresponding to the plurality of unit images of the video signal to obtain a process result, and acquires a detection target image area on the basis of a detection result;
   the processor executes video change detecting process which detects a change in video between the unit images of the video signal; and
   the processor executes correction process on the video signal on the basis of the detection result acquired by the multiple-frame detecting process and a detection result acquired by the video change detecting process, wherein (A) if no change in the video is detected by the video change detecting process, the processor executes
  (A1) the correction process with a first correction intensity on the video signal corresponding to the detection target image area in the unit images of the detection process being performed by the multiple-frame detecting process, and
  (A2) the correction process with a correction intensity different from the first correction intensity on the video signal corresponding to an image area other than the detection target image area, whereas
(B) if a change in the video is detected by the video change detecting circuit, the processor executes the correction process with a correction intensity different from the first correction intensity on the video signal.

7. The video processing; device according to claim 6, wherein
in the multiple-frame detecting process, the processor stops performing the prescribed detection process when the change in the video is detected by the video change detecting process.

8. The video processing device according to claim 6, wherein
in the video change detecting process, the processor acquires an integrated difference value by integrating difference values which are values of differences between the unit images in terms of values of pixels included in the unit images, and the processor detects the change in the video between the unit images in the video signal on the basis of the integrated difference value which is acquired.

9. The video processing device according to claim 6, wherein
in the video change detecting process, the processor performs a motion vector detection process by using the unit images and detects the change in the video between unit images of the video signal on the basis of a result of the motion vector detection process.

10. The video processing device according to claim 6, wherein
in the multiple-frame detecting process, the processor acquires an image area of the unit images detected by the detection process as a detected image area, and
in the video change detecting process, the processor integrates difference values which are values of differences between the unit images in terms of values of pixels included in the unit images and included in the detected image area acquired by the multiple-frame detecting process to obtain an integrated difference value, and the processor detects the change in the video between the unit images in the video signal on the basis of the integrated difference value which is acquired.

* * * * *